US012785784B2

(12) United States Patent
Qiu et al.

(10) Patent No.: US 12,785,784 B2
(45) Date of Patent: Nov. 3, 2026

(54) WEIGHT DETERMINING METHOD AND RELATED APPARATUS

(71) Applicant: HUAWEI TECHNOLOGIES CO., LTD., Shenzhen (CN)

(72) Inventors: Shuang Qiu, Shenzhen (CN); Zhiyong Wang, Shanghai (CN); Yue Jiang, Shanghai (CN); Jianqiang Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 18/521,787

(22) Filed: Nov. 28, 2023

(65) Prior Publication Data

US 2024/0106514 A1 Mar. 28, 2024

Related U.S. Application Data

(63) Continuation of application No. PCT/CN2022/074334, filed on Jan. 27, 2022.

(30) Foreign Application Priority Data

May 31, 2021 (CN) ........................ 202110604208.4

(51) Int. Cl.
*H04B 7/06* (2006.01)
*H04L 5/00* (2006.01)

(52) U.S. Cl.
CPC ....... *H04B 7/06966* (2023.05); *H04B 7/0615* (2013.01); *H04L 5/0048* (2013.01)

(58) Field of Classification Search
CPC ................ H04B 7/0615; H04B 7/0695; H04B 7/06952; H04B 7/06966; H04B 7/088; H04L 5/0048
See application file for complete search history.

(56) References Cited

U.S. PATENT DOCUMENTS

2018/0302131 A1* 10/2018 Zhao ..................... H04B 7/088
2019/0229953 A1 7/2019 Hu et al.
2021/0120536 A1* 4/2021 Gao ................. H04W 72/1268

FOREIGN PATENT DOCUMENTS

CN 101364828 A 2/2009
CN 111490950 A 8/2020
WO 2019010714 A1 1/2019

* cited by examiner

*Primary Examiner* — David B Lugo
(74) *Attorney, Agent, or Firm* — Leydig, Voit & Mayer, Ltd.

(57) ABSTRACT

A weight determining method and a related apparatus, to reduce a beam gain loss caused by a beam selection deviation are described. The method includes receiving an uplink reference signal and obtaining a channel reciprocity parameter between an uplink channel and a downlink channel based on the uplink reference signal. The method further includes determining state information of the downlink channel based on the channel reciprocity parameter, carrier frequency information of the uplink channel, and carrier frequency information of the downlink channel. Moreover, the method includes determining a weight of a downlink reference signal based on the state information of the downlink channel.

10 Claims, 8 Drawing Sheets

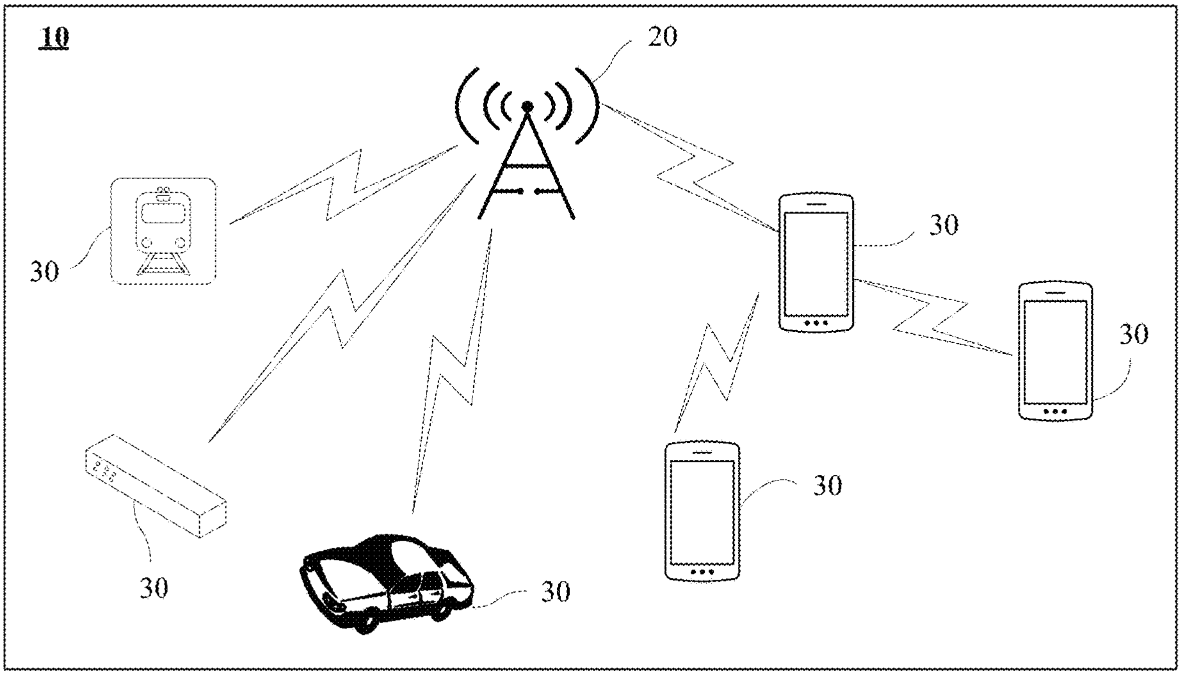

FIG. 1

201: Receive an uplink reference signal

↓

202: Obtain a channel reciprocity parameter between an uplink channel and a downlink channel based on the uplink reference signal

↓

203: Determine state information of the downlink channel based on the channel reciprocity parameter, carrier frequency information of the uplink channel, and carrier frequency information of the downlink channel

↓

204: Determine a weight of a downlink reference signal based on the state information of the downlink channel

FIG. 2

WEIGHT DETERMINING METHOD AND RELATED APPARATUS

CROSS-REFERENCE TO RELATED APPLICATIONS

This application is a continuation of International Application No. PCT/CN2022/074334, filed on Jan. 27, 2022, which claims priority to Chinese Patent Application No. 202110604208.4, filed on May 31, 2021. The disclosures of the aforementioned applications are hereby incorporated by reference in their entireties.

TECHNICAL FIELD

Embodiments of this application relate to the field of communications, and in particular, to a weight determining method and a related apparatus.

BACKGROUND

Massive multiple input multiple output (MIMO) is an antenna system in which a plurality of antennas are used at both a network device end and a user equipment end to form a plurality of channels. A massive multiple input multiple output technology greatly improves a channel capacity.

In a frequency division duplexing (FDD) system, an uplink channel and a downlink channel use different communication frequency bands. When a frequency difference between the uplink channel and the downlink channel is large, and when the network device side determines a weight of a downlink reference signal by using the uplink channel, there is a large deviation from a desirable weight of the downlink reference signal, causing a loss of a downlink beam gain.

SUMMARY

Embodiments of this application provide a weight determining method, to reduce a weight deviation of a downlink reference signal, thereby improving a downlink beam gain.

A first aspect of embodiments of this application provides a weight determining method. The method may be performed by a network device; may be performed by a component of the network device such as a processor, a chip, or a chip system of the network device; or may be implemented by a logical module or software that can implement all or some functions of the network device. The weight determining method provided in the first aspect includes: receiving an uplink reference signal; obtaining a channel reciprocity parameter between an uplink channel and a downlink channel based on the uplink reference signal; determining state information of the downlink channel based on the channel reciprocity parameter, carrier frequency information of the uplink channel, and carrier frequency information of the downlink channel; and determining a weight of a downlink reference signal based on the state information of the downlink channel. In this embodiment of this application, the network device obtains the state information of the downlink channel based on reciprocity between the uplink channel and the downlink channel, the carrier frequency information of the uplink channel, the carrier frequency information of the downlink channel, and an uplink reference signal, and further determines an accurate weight of the downlink reference signal based on the state information of the downlink channel, thereby reducing a weight deviation of the downlink reference signal and improving accuracy of beam selection.

In a possible implementation, the uplink reference signal includes a sounding reference signal SRS or a demodulation reference signal. The reciprocity parameter includes fading or an overall phase, where the overall phase is determined based on channel reciprocity related to a carrier frequency. The carrier frequency information includes an uplink channel frequency and a downlink channel frequency. In a possible implementation, the channel reciprocity parameter includes a first channel reciprocity parameter and a second channel reciprocity parameter. The first channel reciprocity parameter is related to an amplitude and a phase that correspond to a multipath channel, and the second channel reciprocity parameter is related to a distance and an angle that correspond to the multipath channel.

In a possible implementation, the first reciprocity parameter and the second reciprocity parameter are determined based on a one-dimensional relaxation algorithm.

In a possible implementation, the channel reciprocity parameter further includes the amplitude, the phase, the distance, or the angle corresponding to the multipath channel. The distance includes a propagation distance, an azimuth distance of an antenna element, or an elevation distance of an antenna element. The angle includes a horizontal azimuth angle and an elevation angle.

In this embodiment of this application, the network device determines, with reference to a subcarrier, the first reciprocity parameter and the second reciprocity parameter based on the one-dimensional relaxation algorithm, thereby simplifying a calculation amount of estimating the state information of the downlink channel.

In a possible implementation, the channel reciprocity parameter includes a third channel reciprocity parameter, a fourth channel reciprocity parameter, a fifth channel reciprocity parameter, and a sixth channel reciprocity parameter. The third channel reciprocity parameter is related to an amplitude, a phase, and a distance that correspond to a multipath channel, the fourth channel reciprocity parameter is related to the distance corresponding to the multipath channel, and the fifth channel reciprocity parameter and the sixth channel reciprocity parameter are related to the distance and an angle that correspond to the multipath channel.

In this embodiment of this application, the network device determines, with reference to the subcarrier and an antenna array, the third reciprocity parameter, the fourth reciprocity parameter, and the fifth reciprocity parameter based on a three-dimensional relaxation algorithm, thereby improving accuracy of the network device in estimating the state information of the downlink channel.

In a possible implementation, the process of determining a weight of a downlink reference signal based on the state information of the downlink channel includes: determining beam energy of at least one beam based on the state information of the downlink channel, where the at least one beam is a beam corresponding to the downlink channel; and determining the weight of the downlink reference signal based on the beam energy.

In a possible implementation, the beam energy may be represented by reference signal received power RSRP or an r vector determined based on a capon algorithm. A beam whose beam energy satisfies a preset condition is determined as a target beam, and the weight of the downlink reference signal is determined based on the target beam.

In this embodiment of this application, the network device selects a beam based on the beam energy, to further determine the weight of the downlink reference signal, thereby reducing a beam gain loss and improving accuracy of the weight of the downlink reference signal.

In a possible implementation, the process of determining beam energy of at least one beam based on the state information of the downlink channel includes: determining the beam energy of the at least one beam based on a channel covariance matrix of the downlink channel.

A second aspect of embodiments of this application provides a weight determining method. The method may be performed by a network device; may be performed by a component of the network device such as a processor, a chip, or a chip system of the network device; or may be implemented by a logical module or software that can implement all or some functions of the network device. The weight determining method provided in the second aspect includes: obtaining a phase difference based on carrier frequency information of an uplink channel and carrier frequency information of a downlink channel, where the phase difference is a phase difference between a phase corresponding to a first beam and a phase corresponding to a second beam, the first beam is associated with a carrier frequency of the uplink channel, and the second beam is associated with a carrier frequency of the downlink channel; correcting the first beam based on the phase difference to obtain a corrected first beam; and determining a weight of a downlink reference signal based on the corrected first beam.

In this embodiment of this application, the network device corrects the first beam based on reciprocity between azimuth angles of main lobes of beams of the uplink channel and downlink channel and the phase difference between the first beam and the second beam, to determine the weight of the downlink reference signal based on the corrected first beam, thereby reducing a weight deviation of the downlink reference signal and improving accuracy of beam selection.

In a possible implementation, the process of obtaining a phase difference based on a carrier frequency of an uplink channel and a carrier frequency of a downlink channel includes: obtaining an azimuth angle of the second beam based on the carrier frequency of the downlink channel and the phase corresponding to the second beam; obtaining, based on the azimuth angle of the second beam and the carrier frequency of the uplink channel, the phase corresponding to the first beam; and obtaining the phase difference based on the phase corresponding to the first beam and the phase corresponding to the second beam.

In a possible implementation, the phase of the first beam is obtained based on reciprocity between azimuth angles of the uplink channel and the downlink channel and a correspondence between an azimuth angle of a beam and a phase.

In a possible implementation, the phase difference includes a phase difference in an azimuth direction and a phase difference in an elevation direction.

In this embodiment of this application, the network device corrects the phase of the first beam, so that azimuth angles of main lobes of beams of the uplink channel and the downlink channel are aligned with each other. The network device determines the weight of the downlink reference signal based on a reference signal of the uplink channel, thereby improving accuracy of weight determination.

In a possible implementation, state information of the uplink channel is obtained, and state information of the downlink channel is determined based on the corrected first beam and the state information of the uplink channel.

In this embodiment of this application, the network device may determine the state information of the downlink channel based on the corrected first beam and the state information of the uplink channel, thereby simplifying estimation of the state information of the downlink channel.

In a possible implementation, the process of determining a weight of a downlink reference signal based on the corrected first beam includes: determining beam energy of the second beam based on the corrected first beam; and determining the weight of the downlink reference signal based on the beam energy.

In a possible implementation, the beam energy may be represented by reference signal received power RSRP or an r vector determined based on a capon algorithm.

In this embodiment of this application, the network device selects a beam based on the beam energy, to further determine the weight of the downlink reference signal, thereby reducing a beam gain loss and improving accuracy of the weight of the downlink reference signal.

In a possible implementation, the determining beam energy of the second beam based on the corrected first beam includes: determining the beam energy of the second beam based on the corrected first beam and beam energy of the uncorrected first beam.

In this embodiment of this application, the network device selects the beam based on beam energy of a first beam that is previously known, and further determines the weight of the downlink reference signal, thereby simplifying calculation complexity of the beam energy of the second beam.

In a possible implementation, the process of determining beam energy of the second beam based on the corrected first beam includes: determining the beam energy of the second beam based on a channel covariance matrix of an uplink channel corresponding to the corrected first beam.

A third aspect of embodiments of this application provides a weight determining method. The method may be performed by a terminal; may be performed by a component of the terminal such as a processor, a chip, or a chip system of the terminal; or may be implemented by a logical module or software that can implement all or some functions of the terminal. The weight determining method provided in the third aspect includes: receiving a downlink reference signal; obtaining a channel reciprocity parameter between an uplink channel and a downlink channel based on the downlink reference signal; determining state information of the uplink channel based on the channel reciprocity parameter and carrier frequency information of the uplink channel and the downlink channel; and determining a weight of the uplink reference signal based on the state information of the uplink channel.

In this embodiment of this application, the terminal obtains the state information of the uplink channel based on reciprocity between the uplink channel and the downlink channel, the carrier frequency information of the uplink channel, the carrier frequency information of the downlink channel, and the downlink reference signal, and further determines an accurate weight of the uplink reference signal based on the state information of the uplink channel, thereby reducing a weight deviation of the uplink reference signal and improving accuracy of beam selection.

In a possible implementation, the channel reciprocity parameter includes a first channel reciprocity parameter and a second channel reciprocity parameter. The first channel reciprocity parameter is related to an amplitude and a phase that correspond to a multipath channel. The second channel reciprocity parameter is related to a distance and an angle that correspond to the multipath channel.

In this embodiment of this application, the terminal determines, with reference to a subcarrier, the first reciprocity parameter and the second reciprocity parameter based on a one-dimensional relaxation algorithm, thereby simplifying a calculation amount of estimating the state information of the uplink channel.

In a possible implementation, the channel reciprocity parameter includes a third channel reciprocity parameter, a fourth channel reciprocity parameter, a fifth channel reciprocity parameter, and a sixth channel reciprocity parameter. The third channel reciprocity parameter is related to an amplitude and a distance that correspond to a multipath channel. The fourth channel reciprocity parameter is related to the distance corresponding to the multipath channel. The fifth channel reciprocity parameter and the sixth channel reciprocity parameter are related to the distance and an angle that correspond to the multipath channel.

In this embodiment of this application, the terminal determines, with reference to the subcarrier and an antenna array, the third reciprocity parameter, the fourth reciprocity parameter, and the fifth reciprocity parameter based on a three-dimensional relaxation algorithm, thereby improving accuracy of the terminal in estimating the state information of the uplink channel.

In a possible implementation, the determining a weight of an uplink reference signal based on the state information of the uplink channel includes: determining beam energy of at least one beam based on the state information of the uplink channel, where the at least one beam is a beam corresponding to the uplink channel; and determining the weight of the uplink reference signal based on the beam energy.

In this embodiment of this application, the terminal selects a beam based on the beam energy, to further determine the weight of the uplink reference signal, thereby reducing a beam gain loss and improving accuracy of the weight of the uplink reference signal.

In a possible implementation, the process of determining beam energy of at least one beam based on the state information of the uplink channel includes: determining the beam energy of the at least one beam based on a channel covariance matrix of the uplink channel.

A fourth aspect of embodiments of this application provides a weight determining method. The method may be performed by a terminal; may be performed by a component of the terminal such as a processor, a chip, or a chip system of the terminal; or may be implemented by a logical module or software that can implement all or some functions of the terminal. The weight determining method provided in the fourth aspect includes: obtaining a phase difference based on carrier frequency information of an uplink channel and carrier frequency information of a downlink channel, where the phase difference is a phase difference between a phase corresponding to a first beam and a phase corresponding to a second beam, the first beam is associated with a carrier frequency of the downlink channel, and the second beam is associated with a carrier frequency of the uplink channel; correcting the first beam based on the phase difference to obtain a corrected first beam; and determining a weight of an uplink reference signal based on the corrected first beam.

In this embodiment of this application, the terminal corrects the first beam based on reciprocity between azimuth angles of main lobes of beams of the uplink channel and downlink channel and the phase difference between the first beam and the second beam, to determine the weight of the uplink reference signal based on the corrected first beam, thereby reducing a weight deviation of the uplink reference signal and improving accuracy of beam selection.

In a possible implementation, the obtaining a phase difference based on a carrier frequency of an uplink channel and a carrier frequency of a downlink channel includes: obtaining, based on the carrier frequency of the downlink channel, an azimuth angle of the first beam and the phase corresponding to the first beam; obtaining, based on the azimuth angle of the first beam and the carrier frequency of the uplink channel, the phase corresponding to the second beam; and obtaining the phase difference based on the phase corresponding to the first beam and the phase corresponding to the second beam.

In this embodiment of this application, the terminal corrects the phase of the first beam, so that azimuth angles of main lobes of beams of the uplink channel and the downlink channel are aligned with each other. The terminal determines the weight of the uplink reference signal based on a reference signal of the downlink channel, thereby improving accuracy of weight determination.

In a possible implementation, the terminal obtains state information of the downlink channel; and determines state information of the uplink channel based on the corrected first beam and the state information of the downlink channel.

In this embodiment of this application, the terminal may determine the state information of the downlink channel based on the corrected first beam and the state information of the uplink channel, thereby simplifying estimation of the state information of the downlink channel.

In a possible implementation, the process of determining a weight of an uplink reference signal based on the corrected first beam includes: determining beam energy of the second beam based on the corrected first beam; and determining a weight of a downlink reference signal based on the beam energy.

In this embodiment of this application, the terminal selects a beam based on the beam energy, to further determine the weight of the uplink reference signal, thereby reducing a beam gain loss and improving accuracy of the weight of the uplink reference signal.

In a possible implementation, the process of determining beam energy of the second beam based on the corrected first beam includes: The terminal determines the beam energy of the second beam based on the corrected first beam and beam energy of the uncorrected first beam.

In this embodiment of this application, the terminal selects the beam based on beam energy of a first beam that is previously known, and further determines the weight of the uplink reference signal, thereby simplifying calculation complexity of the beam energy of the second beam.

In a possible implementation, the process of determining beam energy of the second beam based on the corrected first beam includes: determining the beam energy of the second beam based on a channel covariance matrix of a downlink channel corresponding to the corrected first beam.

A fifth aspect of embodiments of this application provides a communication apparatus. The communication apparatus includes units or modules configured to perform the method according to the first aspect and any one of the possible implementations or the method according to the second aspect and any one of the possible implementations. The units or modules included in the communication apparatus may be implemented by software and/or hardware. The communication apparatus may be, for example, a network device, may be a chip, a chip system, a processor, or the like that supports the network device in implementing the foregoing method, or may be a logic module or software that can implement all or some functions of the network device.

A sixth aspect of embodiments of this application provides a communication apparatus. The communication apparatus includes units or modules configured to perform the method according to the third aspect and any one of the possible implementations or the method according to the fourth aspect and any one of the possible implementations. The units or modules included in the communication apparatus may be implemented by software and/or hardware. The communication apparatus may be, for example, a terminal, or may be a chip, a chip system, a processor, or the like that supports the terminal in implementing the foregoing method.

A seventh aspect of embodiments of this application provides a communication apparatus including a processor. The processor is coupled to a memory, and the memory is configured to store a program or instructions. When the program or the instructions are executed by the processor, the apparatus is enabled to perform the method according to the first aspect and any one of the possible implementations of the first aspect, or the method according to the second aspect and any one of the possible implementations of the second aspect.

An eighth aspect of embodiments of this application provides a communication apparatus including a processor. The processor is coupled to a memory, and the memory is configured to store a program or instructions. When the program or the instructions are executed by the processor, the apparatus is enabled to perform the method according to the third aspect and any one of the possible implementations of the third aspect, or the method according to the fourth aspect and any one of the possible implementations of the fourth aspect.

A ninth aspect of embodiments of this application provides a communication system. The communication system includes the communication apparatus in the fifth aspect and the communication apparatus in the seventh aspect. Alternatively, the communication system includes the communication apparatus in the sixth aspect and the communication apparatus in the eighth aspect.

A tenth aspect of embodiments of this application provides a computer-readable storage medium. The computer-readable storage medium stores a program. When the program is executed, a computer is enabled to perform the method according to the first aspect and any one of the possible implementations of the first aspect, or the computer is enabled to perform the method according to the second aspect and any one of the possible implementations of the second aspect, or the computer is enabled to perform the method according to the third aspect and any one of the possible implementations of the third aspect, or the computer is enabled to perform the method according to the fourth aspect and any one of the possible implementations of the fourth aspect.

An eleventh aspect of embodiments of this application provides a computer program product. The computer program product includes computer program code. When the computer program code runs on a computer, the computer is enabled to implement the method according to the first aspect and any one of the possible implementations of the first aspect, or the method according to the second aspect and any one of the possible implementations of the second aspect, or the method according to the third aspect and any one of the possible implementations of the third aspect, or the method according to the fourth aspect and any one of the possible implementations of the fourth aspect.

It may be understood that, for beneficial effects that can be achieved by any communication apparatus, communication system, computer-readable medium, computer program product, or the like provided above, refer to beneficial effects in the corresponding method. Details are not described herein again.

BRIEF DESCRIPTION OF DRAWINGS

FIG. 1 is a schematic diagram of an architecture of a communication system according to an embodiment of this application;

FIG. 2 is a schematic flowchart of a weight determining method according to an embodiment of this application;

DESCRIPTION OF EMBODIMENTS

Figure 3A:
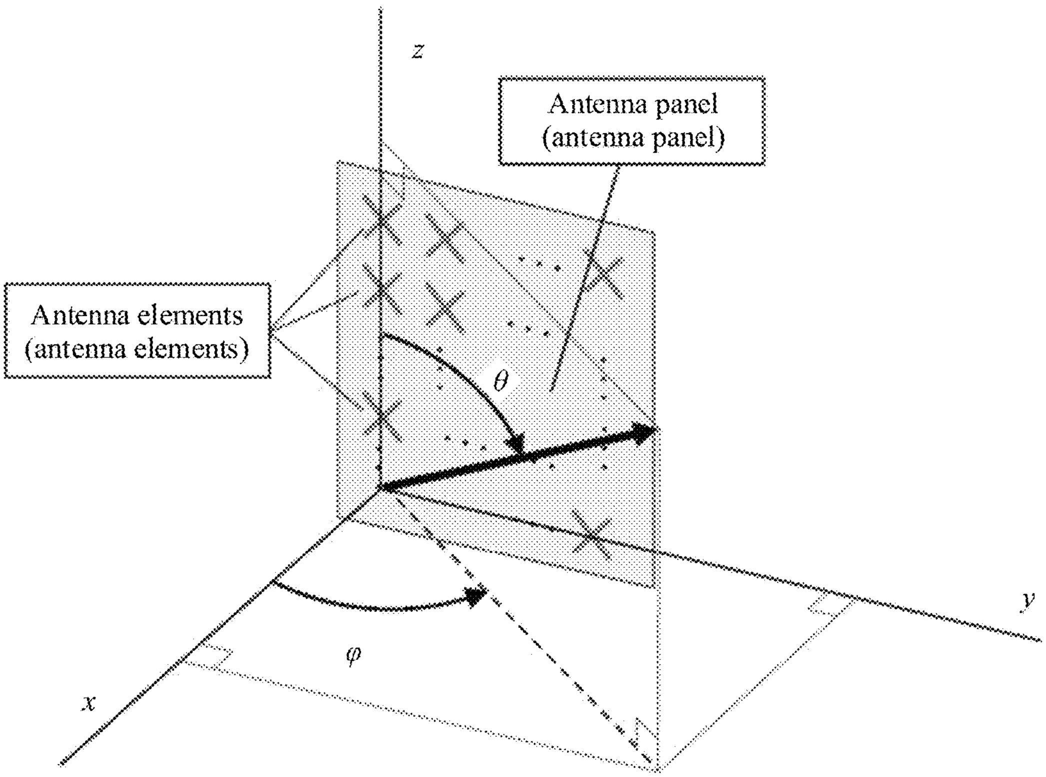
FIG. 3*a* is a schematic diagram of a two-dimensional planar antenna array according to an embodiment of this application.

Embodiments of this application provide a weight determining method and a related apparatus, to reduce a beam gain loss caused by a beam selection deviation.

In the specification, claims, and accompanying drawings of this application, the terms “first”, “second”, “third”, “fourth”, and the like (if existent) are intended to distinguish between similar objects but do not necessarily indicate a specific order or sequence. It should be understood that the terms used in such a way are interchangeable in proper circumstances so that embodiments described herein can be implemented in other orders than the order illustrated or described herein. In addition, the terms “include”, “have” and any other variants mean to cover non-exclusive inclusion, for example, a process, method, system, product, or device that includes a series of steps or units is not necessarily limited to those steps or units that are expressly listed, but may include other steps or units not expressly listed or inherent to such a process, method, product, or device.

In embodiments of this application, the term such as “example” or “for example” represents giving an example, an illustration, or a description. Any embodiment or design scheme described as an “example” or “for example” in embodiments of this application shall not be explained as being more preferred or having more advantages than another embodiment or design scheme. To be precise, use of the term such as "example" or "for example" is intended to present a related concept in a specific manner.

In the following, some terms in this application are explained and described, to facilitate understanding of the terms for a person skilled in the art.

A reference signal may be generally used for channel estimation, or assisting in signal demodulation and detection. The reference signal includes, for example, a demodulation reference signal (DMRS), a channel state information reference signal (CSI-RS), a phase tracking reference signal (PTRS), and a sounding reference signal (SRS). The DMRS is used to assist in the signal demodulation, the CSI-RS is used to obtain channel information, the PTRS is used to obtain phase change information, and the SRS is used to estimate an uplink channel for frequency selective scheduling, or to estimate a downlink channel for downlink beamforming.

In frequency division duplexing (FDD), an uplink channel and a downlink channel use different communication frequency bands, including an uplink channel frequency band and a downlink channel frequency band. The uplink channel frequency band provides a signal transmission channel from a terminal device to a network device, and the downlink channel frequency band provides a signal transmission channel from the network device to the terminal device. In an FDD system, a duplex channel includes two simplex channels. Simultaneous transmission and reception of a radio signal on the duplex channel is allowed by using duplexers in the terminal device and the network device.

Reference signal received power (RSRP) is average power of a signal received on a resource element (RE) carrying the reference signal within a symbol. The RSRP is a parameter indicating radio signal strength in a communication network. The following describes mathematical symbols used in this application.

Kronecker product: B⊗A, for example, $$B \otimes A = \begin{bmatrix} b1 \\ b2 \\ b3 \\ b4 \end{bmatrix} [a1 \quad a2 \quad a3] = \begin{bmatrix} a1b1 & a2b1 & a3b1 \\ a1b2 & a2b2 & a3b2 \\ a1b3 & a2b3 & a3b3 \\ a1b4 & a2b4 & a3b4 \end{bmatrix}.$$

Transpose: $A^T$, for example, $$A = \begin{bmatrix} a11 & a12 & a13 & a14 \\ a21 & a22 & a23 & a24 \\ a31 & a32 & a33 & a34 \\ a41 & a42 & a43 & a44 \end{bmatrix}, A^T = \begin{bmatrix} a11 & a21 & a31 & a41 \\ a12 & a22 & a32 & a42 \\ a13 & a23 & a33 & a43 \\ a14 & a24 & a34 & a44 \end{bmatrix}.$$

Conjugate transpose: $A^H$, for example, $A^H=(\overline{A})T$, where $\overline{A}$ represents a matrix formed by elements that are complex conjugates of elements of A.

Diagonal matrix: diag(A), for example, $$A = \text{diag}(\lambda 1, \lambda 2, \lambda 3) = \begin{bmatrix} \lambda 1 & & \\ & \lambda 2 & \\ & & \lambda 3 \end{bmatrix}.$$

The following uses a communication system shown in FIG. 1 as an example to describe a system architecture to which the method provided in embodiments of this application is applicable. FIG. 1 shows a communication system 10 according to an embodiment of this application. The communication system 10 includes at least one network device 20 and one or more terminal devices 30 connected to the network device 20. Further, different terminal devices 30 may communicate with each other.

The network device 20 in this application is a device that connects the terminal device 30 to a wireless network. For example, the network device 20 may be an evolved NodeB (evolved Node B, eNB, or eNodeB) in LTE, a base station in a 5G network, a 6G network, or a future evolved public land mobile network (PLMN), a broadband network service gateway (BNG), an aggregation switch, or a non-3GPP access device. Alternatively, the network device 20 in embodiments of this application may be a radio controller in a cloud radio access network (CRAN), a transmission and reception point (TRP), a device including the TRP, or the like. This is not specifically limited in embodiments of this application.

In some possible implementations, the base station in embodiments of this application may include various forms of base stations, for example, a macro base station, a micro base station (also referred to as a small cell), a relay station, and an access point. This is not specifically limited in embodiments of this application.

In a possible implementation, the network device 20 in embodiments of this application may alternatively be a central unit (CU) or a distributed unit (DU). Alternatively, the network device may include the CU and the DU. A plurality of DUs may share one CU. One DU may also be connected to a plurality of CUs. The CU and the DU may be understood as division of the network device from a perspective of a logical function. The CU and the DU may be physically separate, or may be deployed together. This is not specifically limited in embodiments of this application. The CU and the DU may be connected through an interface, for example, an F1 interface. The CU and the DU may be obtained through division based on protocol layers of the wireless network. For example, functions of a radio resource control (RRC) protocol layer, a service data adaptation protocol (SDAP) layer, and a packet data convergence protocol (PDCP) layer are configured in the CU, and functions of a radio link control (RLC) protocol layer, a media access control (MAC) protocol layer, a physical (PHY) protocol layer, and the like are configured in the DU.

It may be understood that the division of the processing functions of the CU and the DU based on the protocol layers is merely an example. The processing functions of the CU and the DU may alternatively be divided in another manner.

For example, the CU or the DU may be obtained through division, which has functions of more protocol layers. For example, the CU or the DU may alternatively be obtained through division, which has some processing functions of the protocol layers. In a design, some functions of the RLC layer and functions of protocol layers above the RLC layer are configured in the CU, and remaining functions of the RLC layer and functions of the protocol layers below the RLC layer are configured in the DU. In another design, the functions of the CU or the DU may alternatively be divided based on a service type or according to another system requirement. For example, the functions of the CU or the DU are divided based on a latency. A function whose processing time period needs to satisfy a latency requirement is configured in the DU, and a function whose processing time period does not need to satisfy the latency requirement is configured in the CU. In another design, the CU may alternatively have one or more functions of a core network. One or more CUs may be disposed in a centralized manner or separately disposed. For example, the CU may be disposed on a network side for ease of centralized management. The DU may have a plurality of radio frequency functions. Alternatively, the radio frequency function may be configured remotely.

In some embodiments, the CU may include a CU control plane (CU-CP) and a CU user plane (CU-UP). The CU-CP and the CU-UP may be understood as division of the CU from a perspective of a logical function. The CU-CP and the CU-UP may be obtained through division based on the protocol layers of the wireless network. For example, a function of an RRC protocol layer and a function of a PDCP protocol layer that corresponds to a signaling radio bearer (SRB) are configured in the CU-CP. A function of a PDCP protocol layer that corresponds to a data radio bearer (DRB) is configured in the CU-UP. In addition, a function of an SDAP protocol layer may also be configured in the CU-UP.

It may be understood that all or some functions of the network device in this application may alternatively be implemented by using a software function running on hardware, or may be implemented by using a virtualized function instantiated on a platform (e.g., a cloud platform).

The terminal device 30 in embodiments of this application may be a device, for example, a terminal or a chip that may be used in the terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in IoT, the 5G network, or the future evolved PLMN. The access terminal may be a cellular phone, a cordless phone, a session initiation protocol (SIP) phone, a wireless local loop (WLL) station, a personal digital assistant (PDA), a handheld device having the wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving (self driving), a wireless terminal in remote medical, a wireless terminal in a smart grid, a wireless terminal in transportation safety, a wireless terminal in a smart city, a wireless terminal in a smart home (smart home), or the like. The terminal may be mobile or may be fixed.

The communication system shown in FIG. 1 is merely used as an example, and is not intended to limit the technical solutions in this application. A person skilled in the art should understand that, in a specific implementation process, the communication system may further include another device. This is not limited.

The method provided in embodiments of this application may be performed by a plurality of communication devices, for example, the network device and the terminal device. The following uses the network device as an example to describe a weight determining method provided in embodiments of this application with reference to the accompanying drawings.

It may be understood that the method provided in embodiments of this application may be performed by the communication device, or may be performed by a component of the communication device, for example, a processor, a chip, or a chip system of the communication device, or may be implemented by a logical module or software that may implement all or some functions of the communication device.

FIG. 2 is a schematic flowchart of a weight determining method according to an embodiment of this application. The weight determining method provided in embodiments of this application includes the following steps.

201: Receive an uplink reference signal.

A network device receives the uplink reference signal sent by a terminal device. For example, the uplink reference signal includes a sounding reference signal SRS and a demodulation reference signal (DMRS). The network device obtains state information of an uplink channel based on the received uplink reference signal.

202: Obtain a channel reciprocity parameter between the uplink channel and a downlink channel based on the uplink reference signal.

The network device obtains the channel reciprocity parameter between the uplink channel and the downlink channel based on the uplink reference signal. The channel reciprocity parameter is obtained based on channel reciprocity between the uplink channel and the downlink channel. The channel reciprocity parameter is related to one or more of an amplitude, a phase, an angle, or a distance that correspond to a multipath channel. The distance includes a propagation distance, an azimuth distance of an antenna element, or an elevation distance of the antenna element. The angle includes a horizontal azimuth angle or an elevation angle.

Based on a schematic diagram of a two-dimensional planar antenna array, a process in which the network device obtains the channel reciprocity parameter between the uplink channel and the downlink channel based on the uplink reference signal is described by using examples.

FIG. 3*a* is a schematic diagram of a two-dimensional planar antenna array according to an embodiment of this application. As shown in FIG. 3*a*, an antenna panel array is placed on a yoz plane. It is assumed that, on the antenna panel, there are M antenna elements in an azimuth direction and N antenna elements in an elevation direction. For a $p^{th}$ path, it is assumed that an azimuth angle of the $p^{th}$ path in the azimuth direction is $\phi_p$, and an elevation angle in the elevation direction is $\theta_p$. In this case, a corresponding guiding vector $a_{m,n}(\phi_p,\theta_p)$ of an antenna element, which is an $m^{th}$ antenna element in the azimuth direction and an $n^{th}$ antenna element in the elevation direction, on the $p^{th}$ path satisfies Formula (1):

$$a_{m,n}(\phi_p, \theta_p) = e^{j2\pi\left(\frac{d_H}{\lambda} m \cdot sin\phi_p sin\theta_p + \frac{d_V}{\lambda} n \cdot cos\theta_p\right)}, \tag{1}$$

$$m = 0, 1, \ldots, M-1 \text{ and } n = 0, 1, \ldots, N-1.$$

where $d_H$ represents an antenna element spacing in the azimuth direction, $d_V$ represents an antenna element spacing in the elevation direction, and $\lambda$ represents a wavelength.

The network device estimates the uplink channel based on the guiding vector. For example, an uplink channel corresponding to an $i^{th}$ subcarrier of the antenna element that is the $m^{th}$ antenna element in the azimuth direction and the $n^{th}$ antenna element in the elevation direction satisfies Formula (2):

$$h_{m,n,i}^{ul} = \sum_{p=1}^{P} \alpha_p e^{-j2\pi\frac{d_p}{\lambda_i^{ul}} + j\varphi_p} e^{-j2\pi\frac{d_H m sin\phi_p sin\theta_p}{\lambda_i^{ul}}} \cdot e^{-j2\pi\frac{d_V n cos\theta_p}{\lambda_i^{ul}}} \tag{2}$$

$d_p$ represents the distance corresponding to the multipath channel, $\varphi_p$ represents the phase corresponding to the multipath channel, $\theta_p$ and $\phi_p$ are angles corresponding to the multipath channel, and $$\lambda_i^{ul}$$

represents a wavelength of the $i^{th}$ subcarrier.

$$\lambda_i^{ul}$$

satisfies the following formula:

$$\lambda_i^{ul} = \frac{c}{f_i} = \frac{c}{f_0^{ul} + i\Delta f} \tag{3}$$

$\Delta_f$ represents a carrier spacing, and $$f_0^{ul}$$

represents an uplink start frequency.

Therefore, after $$\lambda_i^{ul}$$

is substituted into Formula (2) of the uplink channel, the uplink channel satisfies the following formula:

$$h_{m,n,i}^{ul} = \sum_{p=1}^{P} \alpha_p e^{j\varphi_p} e^{-j2\pi\frac{d_p}{c}(f_o^{ul}+i\Delta f)} e^{-j2\pi\frac{d_H m sin\phi_p sin\theta_p}{c}(f_o^{ul}+i\Delta f)} \cdot e^{-j2\pi\frac{d_V n cos\theta_p}{c}(f_o^{ul}+i\Delta f)} \tag{4}$$

The formula is further simplified by letting $$\{\omega_p^{(1)}, \omega_p^{(2)}, \omega_p^{(3)}\}_{p=1}^{P} = \left\{\frac{d_p}{c}\Delta f, \frac{d_H \sin\phi_p \sin\theta_p}{c}\Delta f, \frac{d_V \cos\theta_p}{c}\Delta f\right\}_{p=1}^{P}.$$

A simplified uplink channel satisfies the following formula:

$$h_{m,n,i}^{ul} = \sum_{p=1}^{P} \alpha_p e^{j\varphi_p} e^{-\frac{j2\pi f_o^{ul}\omega_p^{(1)}}{\Delta f}} e^{-j2\pi\cdot i\omega_p^{(1)}} e^{-\frac{j2\pi m f_o^{ul}\omega_p^{(2)}}{\Delta f}} e^{-\frac{j2\pi n f_o^{ul}\omega_p^{(3)}}{\Delta f}} \cdot e^{-j2\pi m\cdot i\omega_p^{(2)}} e^{-j2\pi n\cdot i\omega_p^{(3)}} \tag{5}$$

In this embodiment of this application, the network device may obtain the channel reciprocity parameter by using a plurality of algorithms. For example, the network device may obtain, with reference to a subcarrier, the channel reciprocity parameter by using a one-dimensional relaxation (1D-RELAX) algorithm, or may obtain, with reference to the antenna element and the subcarrier, the channel reciprocity parameter by using a three-dimensional relaxation (3D-RELAX) algorithm. This is not specifically limited.

The following separately describes, based on the foregoing two algorithms and by using examples, the channel reciprocity parameter obtained by the network device.

In an example provided in this embodiment of this application, the network device obtains the channel reciprocity parameter by using the 1D-RELAX algorithm, and the channel reciprocity parameter obtained by the network device by using the 1D-RELAX algorithm includes a first channel reciprocity parameter and a second channel reciprocity parameter. The first channel reciprocity parameter is related to the amplitude and the phase that correspond to the multipath channel, and the second channel reciprocity parameter is related to the distance and the angle that correspond to the multipath channel. For example, the first channel reciprocity parameter is fading $$\hat{\gamma}_p^{ul},$$

and the second channel reciprocity parameter is a phase $\hat{\varnothing}_p$.

Specifically, the network device further transforms Formula (5), and the uplink channel satisfies the following formula:

$$h_{m,n,i}^{ul} = \sum_{p=1}^{P} \alpha_p e^{j\varphi_p} e^{-j2\pi\cdot\left(\omega_p^{(1)}+m\omega_p^{(2)}+n\omega_p^{(3)}\right)\frac{f_o^{ul}}{\Delta f}} \cdot e^{-j2\pi\cdot i\left(\omega_p^{(1)}+m\omega_p^{(2)}+n\omega_p^{(3)}\right)} \tag{6}$$

The channel reciprocity parameter obtained by the network device according to the formula of the uplink channel by using the 1D-RELAX algorithm includes overall fading $$\hat{\gamma}_p^{ul(1)}$$

overall phase $\hat{\varnothing}_p$, where $$\hat{\gamma}_p^{ul(1)}$$

and $\hat{\varnothing}_p$ satisfy the following formulas:

$$\hat{\gamma}_p^{ul(1)} = |\alpha_p| e^{j\varphi_p} \tag{7}$$

$$\hat{\varnothing}_p = \left(\omega_p^{(1)} + m\omega_p^{(2)} + n\omega_p^{(3)}\right) \tag{8}$$

In Formula (8), $$\{\omega_p^{(1)}, \omega_p^{(2)}, \omega_p^{(3)}\}_{p=1}^{P} = \left\{\frac{d_p}{c}\Delta f, \frac{d_H \sin\phi_p \sin\theta_p}{c}\Delta f, \frac{d_V \cos\theta_p}{c}\Delta f\right\}_{p=1}^{P}.$$

It can be learned from the formulas that, $$\hat{\gamma}_p^{ul(1)}$$

is related to the amplitude $|\alpha_p|$ corresponding to the multipath channel and the phase $\varphi_p$ corresponding to the multipath channel, and $\hat{\varnothing}_p$ is related to the distance $d_p$ corresponding to the multipath channel and the angles $\phi_p$ and $\theta_p$ that correspond to the multipath channel.

In another example provided in this embodiment of this application, the network device obtains the channel reciprocity parameter by using the 3D-RELAX algorithm. The channel reciprocity parameter obtained by the network device by using the 3D-RELAX algorithm includes a third channel reciprocity parameter, a fourth channel reciprocity parameter, a fifth channel reciprocity parameter, and a sixth channel reciprocity parameter.

The third channel reciprocity parameter is related to the amplitude, the phase, and the distance that correspond to the multipath channel, the fourth channel reciprocity parameter is related to the distance corresponding to the multipath channel, the fifth channel reciprocity parameter is related to the distance and the angle that correspond to the multipath channel, and the sixth reciprocity parameter is related to the distance and the angle that correspond to the multipath channel. For example, the third channel reciprocity parameter is $$\hat{\gamma}_p^{ul(2)},$$

the fourth channel reciprocity parameter is $$\hat{\phi}_p^{(1)},$$

the fifth channel reciprocity parameter $$\hat{\phi}_p^{(2)}$$

and the sixth channel reciprocity parameter is $$\hat{\phi}_p^{(3)}.$$

Specifically, the network device further transforms Formula (5), and the uplink channel satisfies the following formula:

$$h_{m,n,i}^{ul} = \sum_{p=1}^{P} \alpha_p e^{j\varphi_p} e^{-\frac{j2\pi f_o^{ul}\omega_p^{(1)}}{\Delta f}} e^{-j2\pi\cdot i\omega_p^{(1)}} e^{-j2\pi m\omega_p^{(2)}\left(\frac{f_o^{ul}}{\Delta f}+i\right)} e^{-j2\pi n\omega_p^{(3)}\left(\frac{f_o^{ul}}{\Delta f}+i\right)} \tag{9}$$

The channel reciprocity parameter obtained by the network device according to the formula of the uplink channel by using the 3D-RELAX algorithm includes $$\hat{\gamma}_p^{ul(2)},\ \hat{\phi}_p^{(1)},\ \hat{\phi}_p^{(2)},\text{ and }\hat{\phi}_p^{(3)},\text{ where }\hat{\gamma}_p^{ul(2)},\ \hat{\phi}_p^{(1)},\ \hat{\phi}_p^{(2)},\text{ and }\hat{\phi}_p^{(3)}$$

satisfy the following formulas:

$$\hat{\gamma}_p^{ul(2)} = |\alpha_p| e^{j\varphi_p} e^{-\frac{j2\pi f_o^{ul}\omega_p^{(1)}}{\Delta f}}, \tag{10}$$

-continued $$\text{where } \{\omega_p^{(1)}\}_{p=1}^{P} = \left\{\frac{d_p}{c}\Delta f\right\}_{p=1}^{P};$$

$$\hat{\phi}_p^{(1)} = \omega_p^{(1)}, \tag{11}$$

$$\text{where } \{\omega_p^{(1)}\}_{p=1}^{P} = \left\{\frac{d_p}{c}\Delta f\right\}_{p=1}^{P};$$

$$\hat{\phi}_p^{(2)} = \omega_p^{(2)}\left(\frac{f_o^{ul}}{\Delta f} + i\right), \tag{12}$$

$$\text{where } \{\omega_p^{(2)}\}_{p=1}^{P} = \left\{\frac{d_H \sin\phi_p \sin\theta_p}{c}\Delta f\right\}_{p=1}^{P};\text{ and}$$

$$\hat{\phi}_p^{(3)} = \omega_p^{(3)}\left(\frac{f_o^{ul}}{\Delta f} + i\right), \tag{13}$$

$$\text{where } \{\omega_p^{(3)}\}_{p=1}^{P} = \left\{\frac{d_V \cos\theta_p}{c}\Delta f\right\}_{p=1}^{P}.$$

It can be learned from the formulas that, $$\hat{\gamma}_p^{ul(1)}$$

is related to the amplitude $|\alpha_p|$ corresponding to the multipath channel, the phase $\varphi_p$ corresponding to the multipath channel, and the distance $d_p$ corresponding to the multipath channel.

$$\hat{\phi}_p^{(1)}$$

is related to the distance $d_p$ corresponding to the multipath channel, $$\hat{\phi}_p^{(2)}$$

related to the distance $d_H$, the angle $\phi_p$, and the angle $\theta_p$ that correspond to the multipath channel, and $$\hat{\phi}_p^{(3)}$$

is related to the distance $d_V$ and the angle $\theta_p$ that correspond to the multipath channel.

203: Determine state information of the downlink channel based on the channel reciprocity parameter, carrier frequency information of the uplink channel, and carrier frequency information of the downlink channel.

The network device determines the state information of the downlink channel based on the channel reciprocity parameter, the carrier frequency information of the uplink channel, and the carrier frequency information of the downlink channel. The channel reciprocity parameter includes the first channel reciprocity parameter such as $$\hat{\gamma}_p^{ul(1)}$$

and the second channel reciprocity parameter such as $\hat{\phi}_p$, or includes the third channel reciprocity parameter such as $$\hat{\gamma}_p^{ul(2)},$$

the fourth channel reciprocity parameter such as $$\hat{\phi}_p^{(1)},$$

the fifth channel reciprocity parameter such as $$\hat{\phi}_p^{(2)},$$

and the sixth channel reciprocity parameter such as $$\hat{\phi}_p^{(3)},$$

The carrier frequency information of the uplink channel includes the uplink start frequency or an uplink center frequency of the uplink channel, where the uplink start frequency is, for example, $$f_0^{ul},$$

and the uplink center frequency is, for example, $$f_c^{ul}.$$

The carrier frequency information of the downlink channel includes a downlink start frequency or a downlink center frequency of the downlink channel, where the downlink start frequency is, for example, $$f_0^{dl},$$

and the downlink center frequency is, for example, $$f_c^{dl}.$$

In an example provided in this embodiment of this application, the network device obtains the state information of the downlink channel based on the channel reciprocity parameters $$\hat{\gamma}_p^{ul(1)}, \hat{\phi}_p, f_0^{ul}, \text{ and } f_0^{dl}$$

that are obtained by using the 1D-RELAX algorithm. The state information of the downlink channel satisfies Formula (14):

$$h_{m,n,i}^{dl} = \sum\nolimits_{p=1}^{P} \hat{\gamma}_p^{ul(1)} e^{j2\pi\hat{\phi}_p \frac{f_o^{ul}-f_o^{dl}}{\Delta f}} \cdot e^{-j2\pi \cdot i\hat{\phi}_p} \tag{14}$$

In another example provided in this embodiment of this application, the network device obtains the state information of the downlink channel based on the channel reciprocity parameters $$\hat{\gamma}_p^{ul(2)}, \hat{\phi}_p^{(1)}, \hat{\phi}_p^{(2)}, \hat{\phi}_p^{(3)}, f_0^{ul}, \text{ and } f_0^{dl}$$

that are obtained by using the 3D-RELAX algorithm. The state information of the downlink channel satisfies Formula (15):

$$h_{m,n,i}^{dl} = \sum\nolimits_{p=1}^{P} \hat{\gamma}_p^{ul(2)} e^{\frac{j2\pi(f_o^{ul}-f_o^{dl})\hat{\phi}_p^{(1)}}{\Delta f}} e^{-j2\pi \cdot i\hat{\phi}_p^{(1)}} e^{-j2\pi m\hat{\phi}_p^{(2)}\frac{f_o^{dl}}{f_o^{ul}}} e^{-j2\pi n\hat{\phi}_p^{(3)}\frac{f_o^{dl}}{f_o^{ul}}} \tag{15}$$

204: Determine a weight of a downlink reference signal based on the state information of the downlink channel.

The network device determines the weight of the downlink reference signal based on the state information of the downlink channel. Specifically, the network device determines beam energy of at least one beam based on the state information of the downlink channel, and the network device determines a weight of a downlink reference beam based on the beam energy. The beam energy includes reference signal received power (RSRP) or an r vector which is solved for based on a capon algorithm.

In an example, if a beam corresponding to the downlink channel is, for example, $B^{DL}$, $B^{DL}$ satisfies Formula (16):

$$B^{DL} = W_{DFT} \times H^{DL} \tag{16}$$

$W_{DFT}$ is a weight matrix of a beam corresponding to the uplink channel, and $H^{DL}$ represents state information of a reconstructed downlink channel.

In this embodiment of this application, a process in which the network device determines the weight of the downlink reference signal based on the state information of the downlink channel includes: The network device determines, based on the state information of the downlink reference signal, a beam corresponding to the carrier frequency information of the downlink channel, and determines the weight of the downlink reference signal based on the beam energy of the at least one beam.

When the beam energy is represented by the reference signal received power RSRP, the RSRP determined by the network device satisfies Formula (17):

$$r_{rsrp}^{DL} = vec\{\text{diag}(B^{DL} \times (B^{DL})^H)\} \tag{17}$$

In a possible embodiment, in a process in which the network device determines the beam energy of the at least one beam based on the state information of the downlink channel, the network device determines the beam energy of the at least one beam based on a channel covariance matrix of the downlink channel. For example, when the beam energy is the reference signal received power RSRP, the RSRP determined by the network device satisfies Formula (18):

$$r_{rsrp}^{DL} = vec\{\text{diag}(W_{DFT}R_{DL}(W_{DFT})^H)\} \tag{18}$$

$R_{DL}=E\{H\times H^H\}$, and $R_{DL}$ is the channel covariance matrix of the downlink channel.

When the beam energy is represented by the r vector that is solved for by the network device based on the capon algorithm, an r vector of the beam corresponding to the downlink channel satisfies the following formula:

$$r(1, k) = \frac{1}{|(W_{DFT}(k, :)R_{DL}^{-1}(W_{DFT}(k, :))^H)|}, \tag{19}$$

where $k = 1, \ldots, 32$; or $$r(1, k) = \frac{|(W_{DFT}(k, :)R_{DL}(W_{DFT}(k, :))^H)|}{|(W_{DFT}(k, :)R_{DL}^{-1}(W_{DFT}(k, :))^H)|}, \tag{20}$$

where k=1, . . . , 32.

The network device determines a beam whose beam energy satisfies a preset condition as a target beam. For example, the network device determines a beam with maximum beam energy as the target beam, and further determines the weight of the downlink reference signal based on the target beam.

Figure 3B:
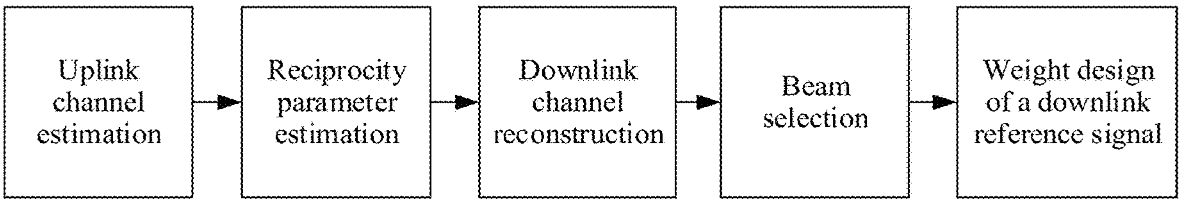
FIG. 3*b* is a schematic flowchart of another weight determining method according to an embodiment of this application.

FIG. 3*b* is a schematic flowchart of a weight designing method according to an embodiment of this application. In the procedure shown in FIG. 3*b*, a network device estimates an uplink channel based on a sounding reference signal, reconstructs a downlink channel based on a reciprocity parameter between the uplink channel and downlink information, and selects a beam based on the downlink channel, so that a weight of a downlink reference signal is determined. The downlink reference signal is, for example, a CSI-RS.

It can be learned from steps in the foregoing embodiment that the network device obtains state information of the downlink channel based on reciprocity between the uplink channel and the downlink channel, carrier frequency information of the uplink channel, carrier frequency information of the downlink channel, and an uplink reference signal, and further determines an accurate weight of the downlink reference signal based on the state information of the downlink channel, thereby reducing a weight deviation of the downlink reference signal and improving accuracy of beam selection.

Figure 4A:
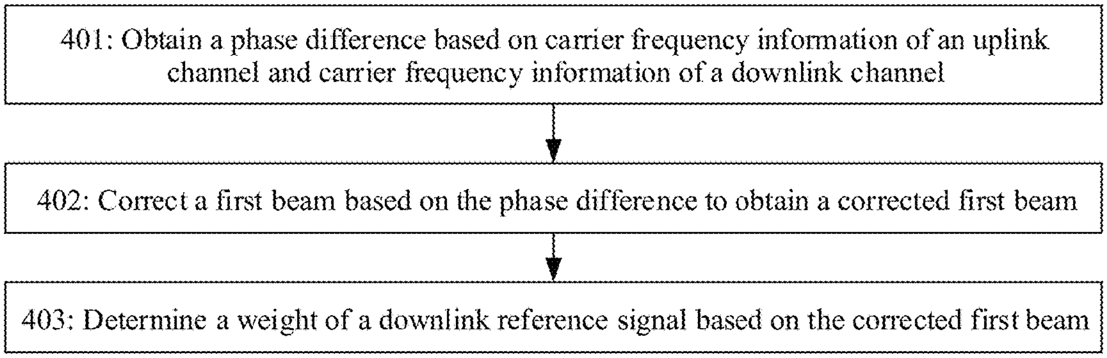
FIG. 4*a* is a schematic flowchart of another weight determining method according to an embodiment of this application.

FIG. 4*a* is a schematic flowchart of a weight determining method according to an embodiment of this application. The weight determining method provided in embodiments of this application includes the following steps.

401: Obtain a phase difference based on carrier frequency information of an uplink channel and carrier frequency information of a downlink channel.

The network device obtains the phase difference based on the carrier frequency information of the uplink channel and the carrier frequency information of the downlink channel. The phase difference is a phase difference between a phase corresponding to a first beam and a phase corresponding to a second beam, the first beam is associated with a carrier frequency of uplink information, and the second beam is associated with a carrier frequency of the downlink channel.

In this embodiment of this application, the network device obtains an azimuth angle of the second beam based on the carrier frequency of the downlink channel and the phase corresponding to the second beam. Because the uplink channel and the downlink channel have reciprocity, the azimuth angle of the second beam is consistent with an azimuth angle of the first beam. Therefore, the network device obtains, based on the azimuth angle of the second beam and the carrier frequency of the uplink channel, the phase corresponding to the first beam, and obtains the phase difference based on the phase corresponding to the first beam and the phase corresponding to the second beam.

Figure 4B:
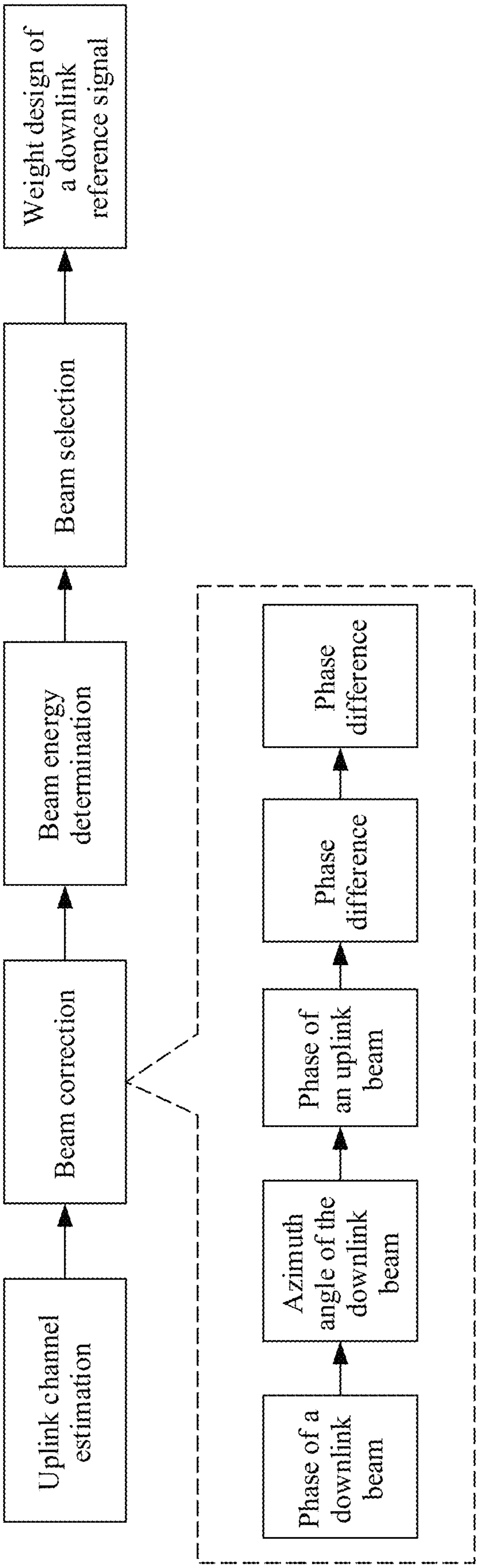
FIG. 4*b* is a schematic flowchart of another weight determining method according to an embodiment of this application.

Refer to FIG. 4*b*. The following describes an example in which the network device obtains the phase difference in this embodiment of this application. The network device obtains the azimuth angle of the second beam based on the carrier frequency of the downlink channel and the phase corresponding to the second beam. The azimuth angle of the second beam and the phase corresponding to the second beam satisfies Formula (21):

$$\sin(\theta_k) = \frac{\varphi_{DL}\lambda_{DL}}{2\pi d} \tag{21}$$

$\theta_k$ is the azimuth angle of the second beam, and $\varphi_{DL}$ is the phase corresponding to the second beam.

The network device corrects the first beam based on the reciprocity between the uplink channel and the downlink channel. Therefore, an azimuth angle of a corrected first beam is also $\theta_k$, and the phase that is determined based on the azimuth angle of the second beam and that corresponds to the first beam satisfies Formula (22):

$$\varphi_{UL}^{crt} = \frac{2\pi d\sin(\theta_k)}{\lambda_{UL}} = \frac{f_{UL}}{f_{DL}}\varphi_{DL} \tag{22}$$

$f_{ul}$ is the carrier frequency of the uplink channel, and $f_{dl}$ is the carrier frequency of the downlink channel.

Further, the network device calculates the phase difference based on the phase corresponding to the first beam and the phase corresponding to the second beam. For example, a phase difference $\Delta\varphi(\theta_k)$ satisfies Formula (23):

$$\Delta\varphi(\theta_k) = \varphi_{UL}^{crt} - \varphi_{DL} \tag{23}$$

402: Correct the first beam based on the phase difference to obtain the corrected first beam.

The network device corrects the first beam based on the phase difference to obtain the corrected first beam. Specifically, the network device separately compensates the phase difference for weight matrices of first beams in the azimuth direction and the elevation direction. For example, $\Delta\varphi^V(\theta_k)$ and $\Delta\varphi^H(\theta_k)$ respectively represent a phase difference of a $K^{th}$ beam in the elevation direction and a phase difference of a $K^{th}$ beam in the azimuth direction. Elements of the weight matrices of the corrected first beam in the elevation direction and the azimuth direction satisfy the following formulas:

$$\text{Element in row } k \text{ and column } n{:}w^{UL}_{V2\times 2(k,n)} = a^{V}_{k}e^{-jn\{\varphi^{V}_{k}+\Delta\varphi^{V}(\theta_k)\}}, \tag{24}$$

where $n=0, 1$.

$$\text{Element in row } k \text{ and column } m{:}w^{UL}_{H8\times 8(k,m)} = a^{H}_{k}e^{-jm\{\varphi^{H}_{k}+\Delta\varphi^{H}(\theta_k)\}}, \tag{25}$$

where $m=0, \ldots, 7$.

The weight matrix $$W^{Crt}_{DFT}$$

of the corrected first beam satisfies Formula (26):

$$W^{Crt}_{DFT} = W^{UL}_{V2\times 2} \otimes W^{UL}_{H8\times 8} \tag{26}$$

403: Determine a weight of a downlink reference signal based on the corrected first beam.

The network device determines the weight of the downlink reference signal based on the corrected first beam. Specifically, the network device determines beam energy of the second beam based on the corrected first beam, and determines the weight of the downlink reference signal based on the beam energy of the second beam.

In this embodiment of this application, the energy of the second beam may be reference signal received power RSRP. For example, reference signal received power of the second beam satisfies Formula (27):

$$r^{UL}_{rsrp} = vec\{\text{diag}(B^{DL}\times(B^{DL})^{H})\} \tag{27}$$

The second beam $B^{DL}$ satisfies Formula (28):

$$B^{DL} = W^{Crt}_{DFT}\times Hsrs \tag{28}$$

The network device sorts the calculated reference signal received power RSRP of the second beam, and determines a weight of a downlink reference signal corresponding to a second beam whose RSRP satisfies a preset condition.

In an example, the network device determines the beam energy of the second beam based on the corrected first beam and beam energy of the uncorrected first beam, and determines the weight of the downlink reference signal based on the beam energy of the second beam. The beam energy may be represented by the reference signal received power or an r vector that is solved for based on a capon algorithm.

For example, the reference signal received power RSRP of the second beam satisfies Formula (29):

$$\begin{aligned} r^{DL}_{rsrp} &= vec\{\text{diag}(B^{DL}\times(B^{DL})^{H})\} \\ &= vec\{\text{diag}(W^{Crt}_{DFT}W^{H}_{DFT}W_{DFT}HsrsHsrs^{H}W^{H}_{DFT}W_{DFT}(W^{Crt}_{DFT})^{H})\} \end{aligned} \tag{29}$$

$W_{DFT}$ is a weight matrix of the uncorrected first beam.

Let $C = W^{Crt}_{DFT}W^{H}_{DFT}$, $R_{BB} = B\times B^{H}$, and $B = W_{DFT}\times H$.

In this case, reference signal received power of a $k^{th}$ second beam satisfies the following formula:

$$r^{DL}_{rsrp}(k) = \sum_{j=1}^{32}\sum_{i=1}^{32} C_{k,i}R_{BB}(i,j)C^{*}_{k,j} \tag{30}$$

When the network device ignores an off-diagonal element of $R_{BB}$, the foregoing formula is simplified to the following formula:

$$r^{DL}_{rsrp}(k) = \sum_{i=1}^{32} C_{k,i}R_{BB}(i,i)C^{*}_{k,i} \tag{31}$$

In another example, the network device determines the beam energy of the second beam based on a channel covariance matrix of an uplink channel corresponding to the corrected first beam. The beam energy of the second beam may be represented by the reference signal received power.

For example, the reference signal received power RSRP of the second beam satisfies the following formula:

$$\begin{aligned} r^{DL}_{rsrp} &= E\{vec\{\text{diag}(W^{Crt}_{DFT}\times Hsrs\times(W^{Crt}_{DFT}\times Hsrs)^{H})\}\} = \\ &vec\{\text{diag}(W^{Crt}_{DFT}E\{Hsrs\ Hsrs^{H}\}(W^{Crt}_{DFT})^{H})\} = \\ &vec\{\text{diag}(W^{Crt}_{DFT}R_{UL}(W^{Crt}_{DFT})^{H})\} \end{aligned} \tag{32}$$

The energy of the second beam in this embodiment of this application may alternatively be represented by the r vector that is solved for based on the capon algorithm. For example, the r vector of the second beam satisfies the following formula:

$$r(1,k) = \frac{1}{|(W^{Crt}_{DFT}(k,:)R^{-1}_{SRS}(W^{Crt}_{DFT}(k,:))^{H})|}, \tag{33}$$

where $k=1, \ldots, 32$; or $$r(1,k) = \frac{|(W^{Crt}_{DFT}(k,:)R_{SRS}(W^{Crt}_{DFT}(k,:))^{H})|}{|(W^{Crt}_{DFT}(k,:)R^{-1}_{SRS}(W^{Crt}_{DFT}(k,:))^{H})|}, \tag{34}$$

where $k=1, \ldots, 32$.

$R_{SRS}$ represents the channel covariance matrix of the uplink channel, and $$W^{Crt}_{DFT}$$

represents the weight matrix of the corrected first beam.

It can be learned from the steps in the foregoing embodiment that the network device corrects the first beam based on reciprocity between azimuth angles of main lobes of beams of the uplink channel and downlink channel and the phase difference between the first beam and the second beam, to determine the weight of the downlink reference signal based on the corrected first beam, thereby reducing a weight deviation of the downlink reference signal and improving accuracy of beam selection.

Figure 5A:
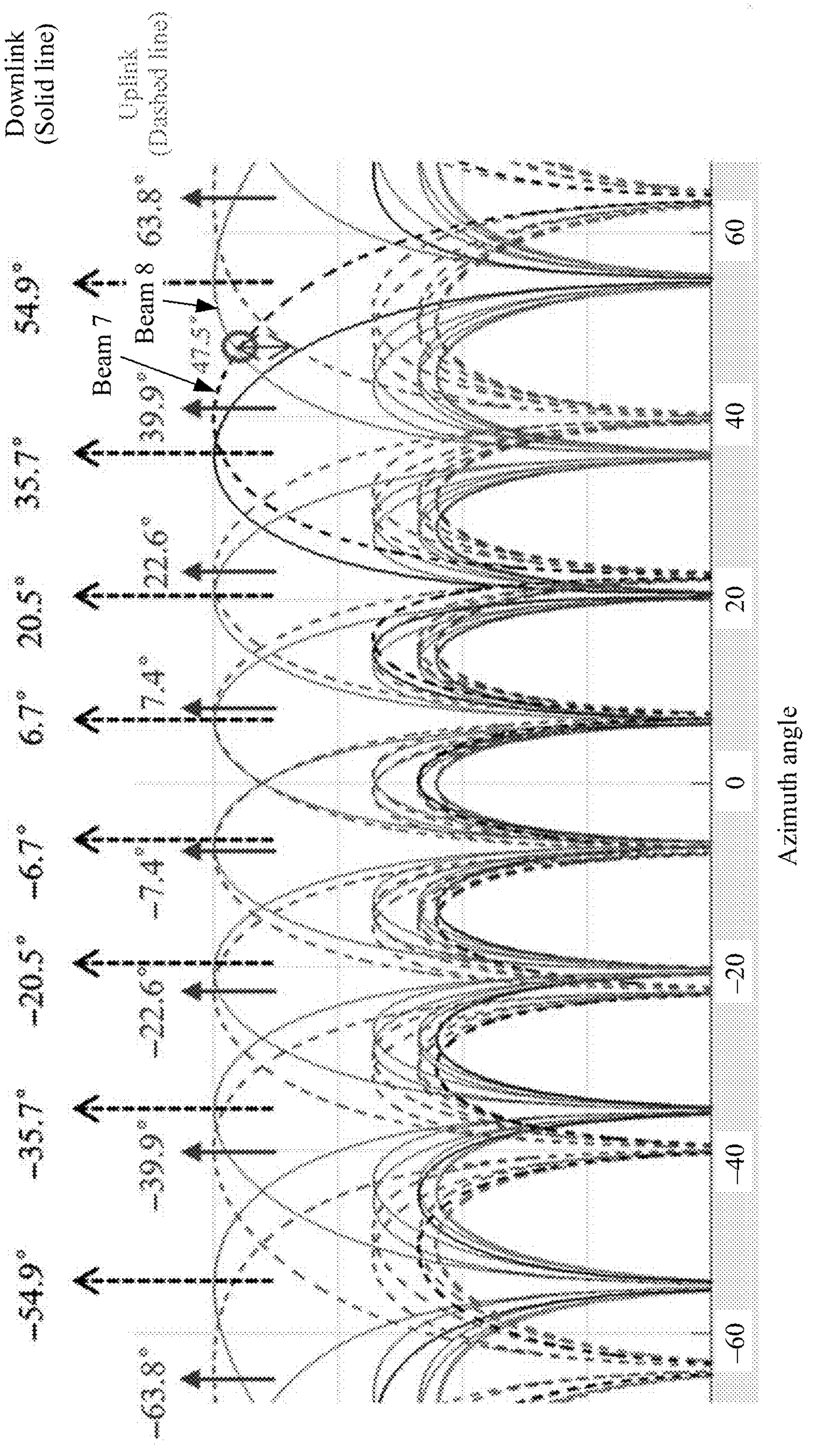
FIG. 5*a* is a schematic diagram of a horizontal azimuth angle of a beam according to an embodiment of this application.

FIG. 5*a* shows horizontal azimuth angles of beams corresponding to frequency channel numbers of an uplink channel and a downlink channel before the beams are corrected. A solid line represents the horizontal azimuth angle of the beam corresponding to the frequency channel number of the downlink channel, and a dashed line represents the horizontal azimuth angle of the beam corresponding to the frequency channel number of the uplink channel. As shown in FIG. 5*a*, there is a deviation between azimuth angles of the beams corresponding to the frequency channel numbers of the uplink and downlink channel before the beam is corrected. When a network device selects a beam, for example, when a user exists at a position of 47.5°, and when the uplink channel is used to select the beam, an eighth beam is selected. However, when the downlink channel is used to select the beam, a seventh beam is selected, thereby reducing a beam gain loss.

Figure 5B:
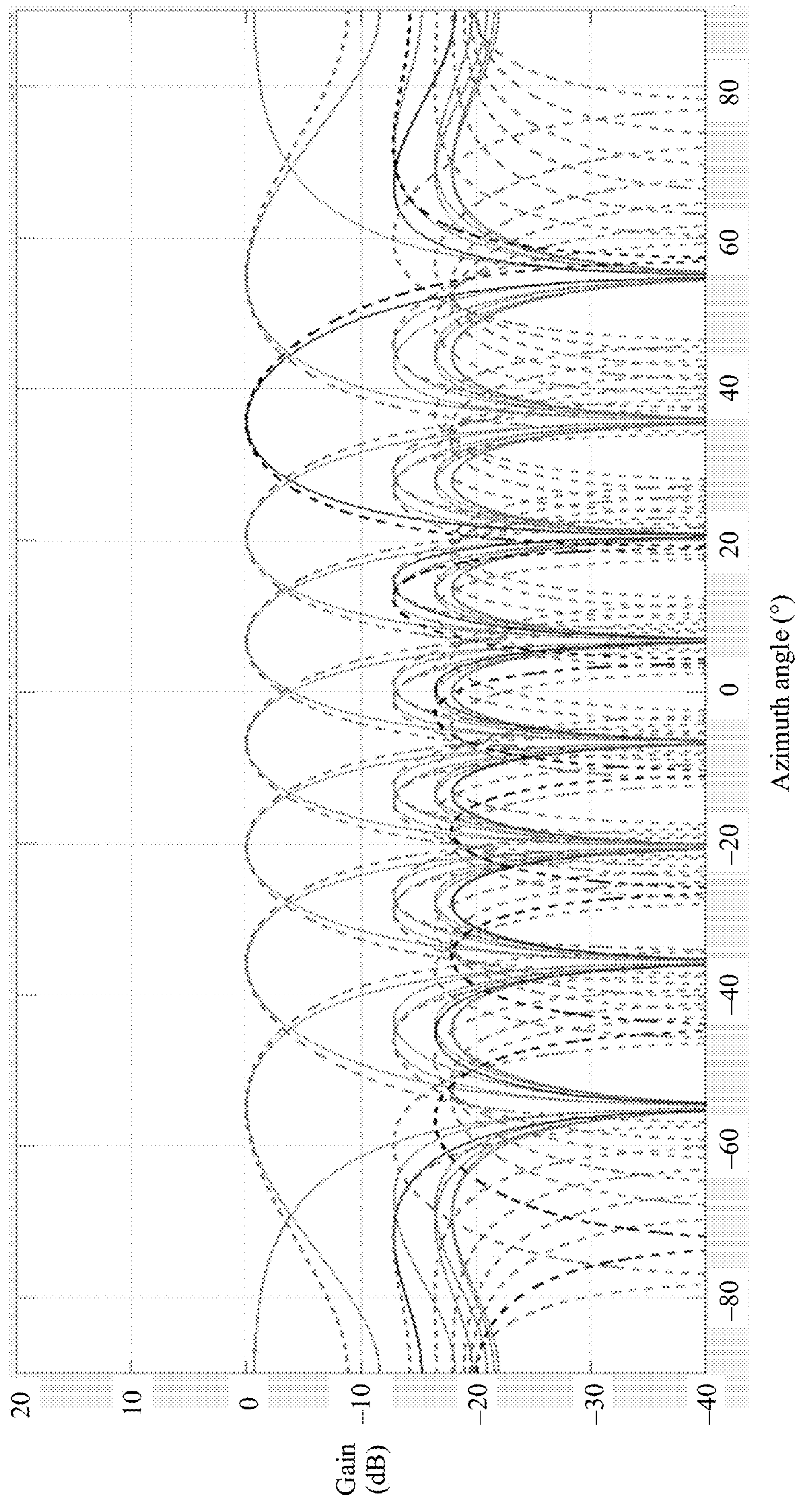
FIG. 5*b* is a schematic diagram of a horizontal azimuth angle of a corrected beam according to an embodiment of this application.

FIG. 5*b* shows horizontal azimuth angles of beams corresponding to frequency channel numbers of an uplink channel and a downlink channel after the beams are corrected. A solid line represents the horizontal azimuth angle of the beam corresponding to the frequency channel number of the downlink channel, and a dashed line represents the horizontal azimuth angle of the beam corresponding to the frequency channel number of the uplink channel. As shown in FIG. 5*b*, azimuth angles of main lobes of corrected uplink beams are aligned with each other, thereby reducing a beam gain loss.

Figure 6:
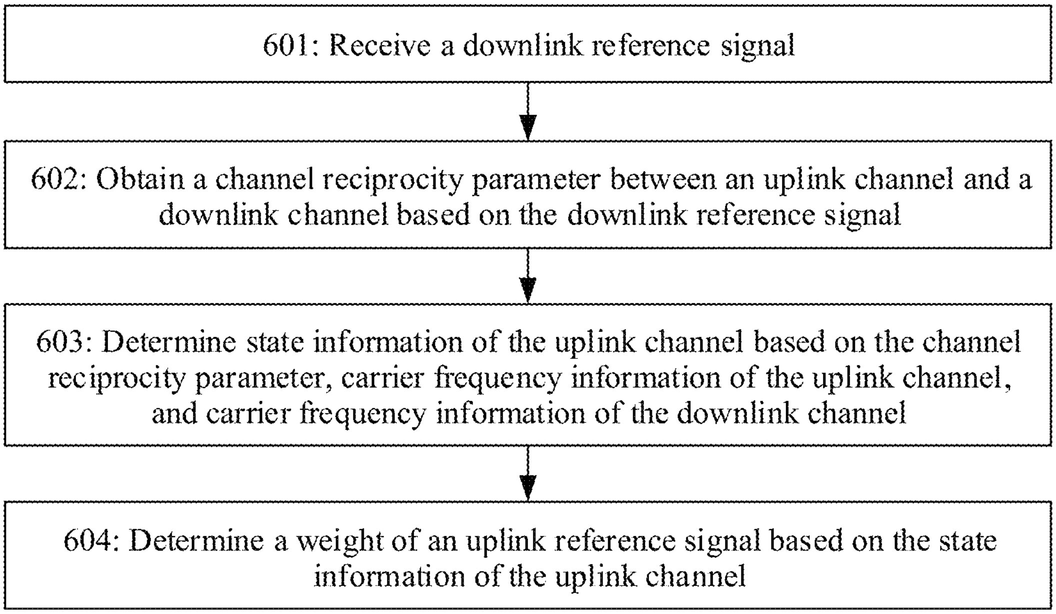
FIG. 6 is a schematic flowchart of another weight determining method according to an embodiment of this application.

FIG. 6 is a schematic flowchart of a weight determining method according to an embodiment of this application. The weight determining method provided in embodiments of this application includes the following steps.

601: Receive a downlink reference signal.

602: Obtain a reciprocity parameter between an uplink channel and a downlink channel based on the downlink reference signal.

603: Determine state information of the uplink channel based on the channel reciprocity parameter, carrier frequency information of the uplink channel, and carrier frequency information of the downlink channel.

604: Determine a weight of an uplink reference signal based on the state information of the uplink channel.

The method performed by a terminal in Step 601 to Step 604 is similar to the method performed by a network device in Step 201 to Step 204 in the foregoing method embodiment. Details are not described herein again.

In this embodiment of this application, the terminal obtains the state information of the uplink channel based on reciprocity between the uplink channel and the downlink channel, the carrier frequency information of the uplink channel, the carrier frequency information of the downlink channel, and the downlink reference signal, and further determines an accurate weight of the uplink reference signal based on the state information of the uplink channel, thereby reducing a weight deviation of the uplink reference signal and improving accuracy of beam selection.

Figure 7:
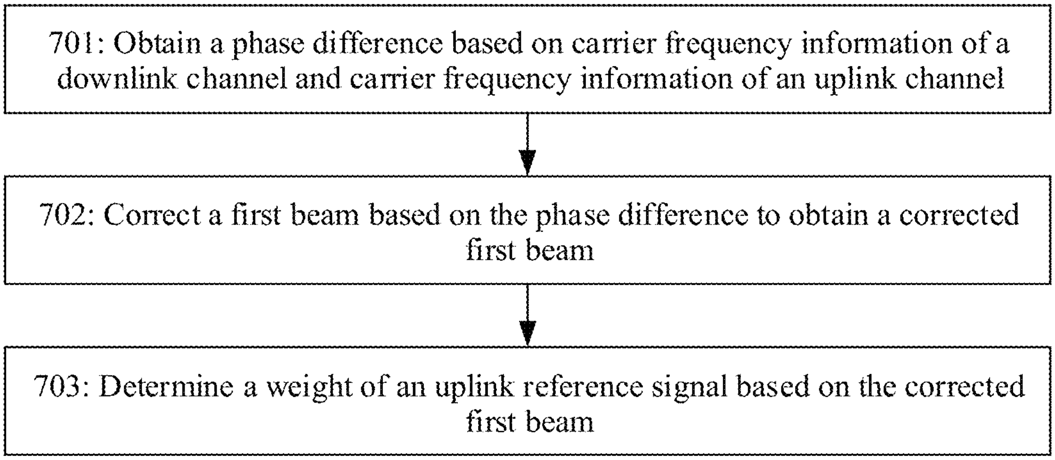
FIG. 7 is a schematic flowchart of another weight determining method according to an embodiment of this application.

FIG. 7 is a schematic flowchart of a weight determining method according to an embodiment of this application. The weight determining method provided in embodiments of this application includes the following steps.

701: Obtain a phase difference based on carrier frequency information of a downlink channel and carrier frequency information of an uplink channel.

702: Correct a first beam based on the phase difference to obtain a corrected first beam.

703: Determine a weight of an uplink reference signal based on the corrected first beam.

The method performed by a terminal in Step 701 to Step 703 is similar to the method performed by a network device in Step 401 to Step 403 in the foregoing method embodiment. Details are not described herein again.

In this embodiment of this application, the terminal corrects the first beam based on reciprocity between azimuth angles of main lobes of beams of the uplink channel and downlink channel and the phase difference between the first beam and the second beam, to determine the weight of the uplink reference signal based on the corrected first beam, thereby reducing a weight deviation of the uplink reference signal and improving accuracy of beam selection.

The foregoing describes a signal processing method provided in embodiments of this application. The following describes related apparatuses in embodiments of this application with reference to the accompanying drawings.

Figure 8:
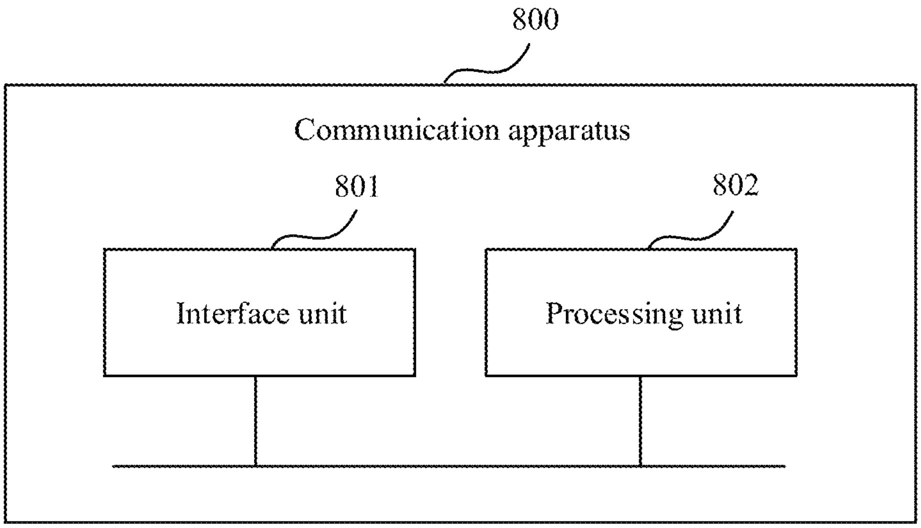
FIG. 8 is a schematic diagram of a structure of a communication apparatus according to an embodiment of this application.

FIG. 8 is a schematic diagram of a communication apparatus according to an embodiment of this application. The communication apparatus is configured to implement the steps corresponding to the network device or the terminal in the foregoing embodiments. As shown in FIG. 8, the communication apparatus 800 includes an interface unit 801 and a processing unit 802.

In an embodiment, the communication apparatus 800 is configured to implement the steps corresponding to the network device in the foregoing embodiments. The interface unit 801 is configured to receive an uplink reference signal. The processing unit 802 is configured to obtain a channel reciprocity parameter between an uplink channel and a downlink channel based on the uplink reference signal. The processing unit 802 is further configured to determine state information of the downlink channel based on the channel reciprocity parameter, carrier frequency information of the uplink channel, and carrier frequency information of the downlink channel, and determine a weight of the downlink reference signal based on the state information of the downlink channel.

In an optional implementation, the channel reciprocity parameter includes a first channel reciprocity parameter and a second channel reciprocity parameter. The first channel reciprocity parameter is related to an amplitude and a phase that correspond to a multipath channel, and the second channel reciprocity parameter is related to a distance and an angle that correspond to the multipath channel.

In an optional implementation, the channel reciprocity parameter includes a third channel reciprocity parameter, a fourth channel reciprocity parameter, a fifth channel reciprocity parameter, and a sixth channel reciprocity parameter. The third channel reciprocity parameter is related to the amplitude, the phase, and the distance that correspond to the multipath channel, the fourth channel reciprocity parameter is related to the distance corresponding to the multipath channel, and the fifth channel reciprocity parameter and the sixth channel reciprocity parameter are related to the distance and the angle that correspond to the multipath channel.

In an optional implementation, the processing unit 802 is specifically configured to: determine beam energy of at least one beam based on the state information of the downlink channel, where the at least one beam is a beam corresponding to the downlink channel; and determine the weight of the downlink reference signal based on the beam energy.

In an optional implementation, the processing unit 802 is specifically configured to determine the beam energy of the at least one beam based on a channel covariance matrix of the downlink channel.

In another embodiment, the communication apparatus 800 is configured to implement the steps corresponding to the network device in the foregoing embodiments. The processing unit 802 is configured to obtain a phase difference based on the carrier frequency information of the uplink channel and the carrier frequency information of the downlink channel. The phase difference is a phase difference between a phase corresponding to a first beam and a phase corresponding to a second beam, the first beam is associated with a carrier frequency of the uplink channel, and the second beam is associated with a carrier frequency of the downlink channel.

The processing unit 802 is further configured to: correct the first beam based on the phase difference to obtain a corrected first beam, and determine the weight of the downlink reference signal based on the corrected first beam.

In an optional implementation, the processing unit 802 is specifically configured to: obtain an azimuth angle of the second beam based on the carrier frequency of the downlink channel and the phase corresponding to the second beam, obtain the phase corresponding to the first beam based on the azimuth angle of the second beam and the carrier frequency of the uplink channel, and obtain the phase difference based on the phase corresponding to the first beam and the phase corresponding to the second beam.

In an optional implementation, the communication apparatus further includes the interface unit 801, where the interface unit 801 is configured to obtain state information of the uplink channel.

The processing unit 802 is further configured to determine the state information of the downlink channel based on the corrected first beam and the state information of the uplink channel.

In an optional implementation, the processing unit 802 is further configured to: determine beam energy of the second beam based on the corrected first beam; and determine the weight of the downlink reference signal based on the beam energy.

In an optional implementation, the processing unit 802 is further configured to determine the beam energy of the second beam based on the corrected first beam and beam energy of the uncorrected first beam.

In an optional implementation, the processing unit 802 is further configured to determine the beam energy of the second beam based on a channel covariance matrix of an uplink channel corresponding to the corrected first beam.

In another embodiment, the communication apparatus 800 is configured to implement the steps corresponding to the terminal in the foregoing embodiments. The interface unit 801 is configured to receive the downlink reference signal. The processing unit 802 is configured to obtain the channel reciprocity parameter between the uplink channel and the downlink channel based on the downlink reference signal.

The processing unit 802 is further configured to determine the state information of the uplink channel based on the channel reciprocity parameter, the carrier frequency information of the uplink channel, and the carrier frequency information of the downlink channel.

The processing unit 802 is further configured to determine a weight of the uplink reference signal based on the state information of the uplink channel.

In a possible implementation, the channel reciprocity parameter includes the first channel reciprocity parameter and the second channel reciprocity parameter. The first channel reciprocity parameter is related to the amplitude and the phase that correspond to the multipath channel, and the second channel reciprocity parameter is related to the distance and the angle that correspond to the multipath channel.

In a possible implementation, the channel reciprocity parameter includes the third channel reciprocity parameter, the fourth channel reciprocity parameter, the fifth channel reciprocity parameter, and the sixth channel reciprocity parameter. The third channel reciprocity parameter is related to the amplitude and the distance that correspond to the multipath channel, the fourth channel reciprocity parameter is related to the distance corresponding to the multipath channel, and the fifth channel reciprocity parameter and the sixth channel reciprocity parameter are related to the distance and the angle that correspond to the multipath channel.

In a possible implementation, the processing unit 802 is specifically configured to: determine the beam energy of the at least one beam based on the state information of the uplink channel, where the at least one beam is the beam corresponding to the uplink channel; and determine the weight of the uplink reference signal based on the beam energy.

In a possible implementation, the processing unit 802 is specifically configured to determine the beam energy of the at least one beam based on a channel covariance matrix of the uplink channel.

In another embodiment, the communication apparatus 800 is configured to implement the steps corresponding to the terminal in the foregoing embodiments. The processing unit 802 is configured to obtain the phase difference based on the carrier frequency information of the uplink channel and the carrier frequency information of the downlink channel. The phase difference is the phase difference between the phase corresponding to the first beam and the phase corresponding to the second beam, the first beam is associated with the carrier frequency of the downlink channel, and the second beam is associated with the carrier frequency of the uplink channel.

The processing unit 802 is further configured to correct the first beam based on the phase difference to obtain the corrected first beam.

The processing unit 802 is further configured to determine the weight of the uplink reference signal based on the corrected first beam.

In a possible implementation, the processing unit 802 is specifically configured to: obtain an azimuth angle of the first beam and the phase corresponding to the first beam based on the carrier frequency of the downlink channel, obtain the phase corresponding to the second beam based on the azimuth angle of the first beam and the carrier frequency of the uplink channel, and obtain the phase difference based on the phase corresponding to the first beam and the phase corresponding to the second beam.

In a possible implementation, the communication apparatus further includes the interface unit 801. The interface unit 801 is specifically configured to obtain the state information of the downlink channel. The processing unit 802 is further configured to determine the state information of the uplink channel based on the corrected first beam and the state information of the downlink channel.

In a possible implementation, the processing unit 802 is specifically configured to: determine the beam energy of the second beam based on the corrected first beam, and determine the weight of the downlink reference signal based on the beam energy.

In a possible implementation, the processing unit 802 is specifically configured to determine the beam energy of the second beam based on the corrected first beam and the beam energy of the uncorrected first beam.

In a possible implementation, the processing unit 802 is specifically configured to determine the beam energy of the second beam based on a channel covariance matrix of a downlink channel corresponding to the corrected first beam.

Optionally, the communication apparatus may further include a storage unit. The storage unit is configured to store data or instructions (which may also be referred to as code or a program). The foregoing units may interact with or be coupled to the storage unit, to implement a corresponding method or function. For example, the processing unit 802 may read the data or the instructions in the storage unit, so that the communication apparatus is enabled to implement the method in the foregoing embodiments.

It should be understood that division into the units in the communication apparatus is merely logical function division. In actual implementation, all or some of the units may be integrated into one physical entity, or may be physically separated. In addition, all the units in the communication apparatus may be implemented in a form of software invoked by a processing element, or may be implemented in a form of hardware. Alternatively, some units may be implemented in a form of software invoked by a processing element, and some units may be implemented in a form of hardware. For example, each unit may be a separately disposed processing element, or may be integrated into a chip of the communication apparatus for implementation. In addition, each unit may alternatively be stored in a memory in a form of a program to be invoked by a processing element of the communication apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing method or the foregoing units may be implemented by using a hardware integrated logic circuit in a processor element, or may be implemented in a form of software invoked by the processing element.

In an example, the units in any one of the foregoing communication apparatuses may be configured as one or more integrated circuits for performing the foregoing methods, for example, one or more application specific integrated circuits (ASICs), one or more microprocessors (DSPs), one or more field programmable gate arrays (FPGAs), or a combination of at least two of these integrated circuit forms. For another example, when the units in the communication apparatus may be implemented in a form in which a processing element schedules a program, the processing element may be a general-purpose processor, for example, a central processing unit (CPU) or another processor that can invoke the program. For another example, the units may be integrated together and implemented in a form of a system-on-a-chip (SOC).

Figure 9:
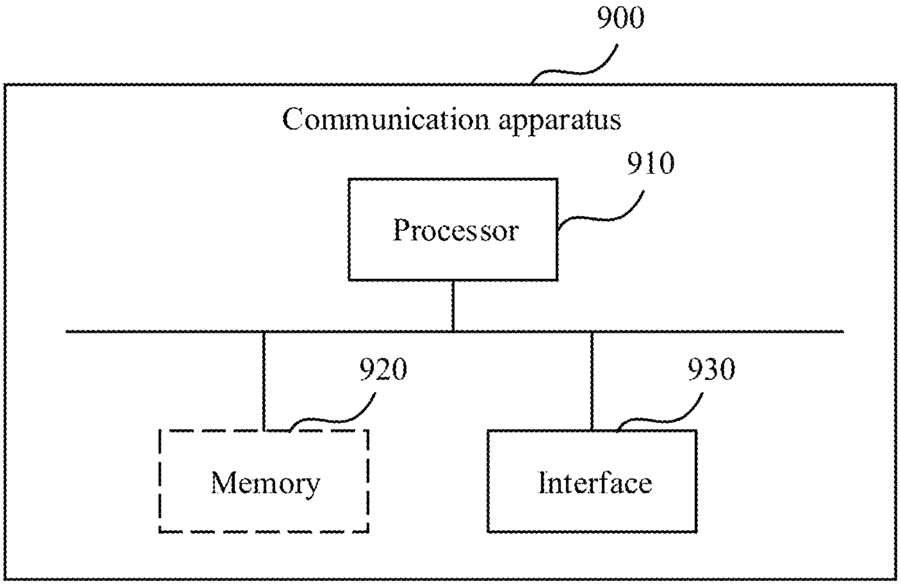
FIG. 9 is a schematic diagram of a structure of another communication apparatus according to an embodiment of this application.

FIG. 9 is a schematic diagram of a communication apparatus according to an embodiment of this application. The communication apparatus is configured to implement operations of a network device or a terminal in the foregoing embodiments. As shown in FIG. 9, the communication apparatus includes a processor 910 and an interface 930. The processor 910 is coupled to the interface 930. The interface 930 is configured to communicate with another device. The interface 930 may be a transceiver or an input/output interface. The interface 930 may be, for example, an interface circuit. Optionally, the communication apparatus may further include a memory 920, configured to store instructions executed by the processor 910, store input data needed by the processor 910 to run instructions, or store data generated after the processor 910 runs the instructions.

The method performed by the network device or the terminal in the foregoing embodiments may be implemented by the processor 910 by invoking a program stored in a memory (which may be the memory 920 in the network device or the terminal, or may be an external memory). In other words, the network device or the terminal may include the processor 910. The processor 910 performs, by invoking the program in the memory, the method performed by the network device or the terminal in the foregoing method embodiments. The processor herein may be an integrated circuit having a signal processing capability, for example, a CPU. The network device or the terminal may be implemented by configuring the network device or the terminal as the one or more integrated circuits for implementing the foregoing method, for example, one or more ASICs, one or more microprocessors DSPs, one or more FPGAs, or a combination of at least two of the integrated circuit forms. Alternatively, the foregoing implementations may be combined.

Specifically, functions/implementation processes of an interface unit 801 and a processing unit 802 in FIG. 8 may be implemented by the processor 910 in the communication apparatus 900 shown in FIG. 9 by invoking computer-executable instructions stored in the memory 920. Alternatively, the function/the implementation process of the processing unit 802 in FIG. 8 may be implemented by the processor 910 in the communication apparatus 900 shown in FIG. 9 by invoking the computer-executable instructions stored in the memory 920, and the function/the implementation process of the interface unit 801 in FIG. 8 may be implemented by the interface 930 in the communication apparatus 900 shown in FIG. 9. For example, the function/the implementation process of the interface unit 801 may be implemented by the processor by invoking program instructions in the memory to drive the interface 930.

When the foregoing communication apparatus is a chip used in a terminal device, the chip in the terminal device implements the function of the terminal device in the foregoing method embodiments. The chip in the terminal device receives information from another module (e.g., a radio frequency module or an antenna) in the terminal device, where the information is from another terminal device or another network device. Alternatively, the chip in the terminal device sends information to another module (e.g., a radio frequency module or an antenna) in the terminal device, where the information is sent by the terminal device to another terminal device or another network device.

When the foregoing communication apparatus is a chip used in a network device, the chip in the network device implements the function of the network device in the foregoing method embodiments. The chip in the network device receives information from another module (e.g., a radio frequency module or an antenna) in the network device, where the information is from another network device or another terminal device. Alternatively, the chip in the network device sends information to another module (e.g., a radio frequency module or an antenna) in the network device, where the information is sent by the network device to another network device or another terminal device.

The interface unit 801 in the communication apparatus 800 is equivalent to the interface 930 in the communication apparatus 900. The processing unit 802 in the communication apparatus 800 may be equivalent to the processor 910 in the communication apparatus 900.

Figure 10:
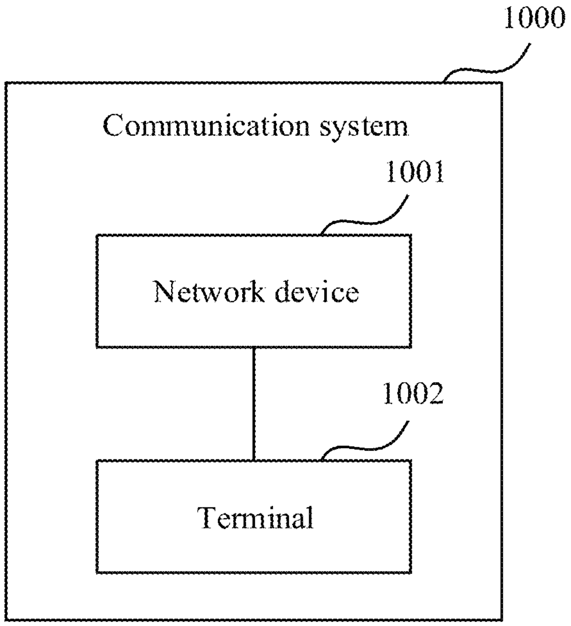
FIG. 10 is a schematic diagram of a structure of a communication apparatus according to an embodiment of this application.

FIG. 10 is a schematic diagram of a communication system according to an embodiment of this application. The communication system 1000 includes a network device 1001 and a terminal 1002. The network device 1001 may be the network device in the foregoing method embodiments, and the terminal 1002 may be the terminal in the foregoing method embodiments.

In another embodiment of this application, a computer-readable storage medium is further provided. The computer-readable storage medium stores computer-executable instructions. When a processor of a device executes the computer-executable instructions, the device performs the method performed by the network device in the foregoing method embodiments.

In another embodiment of this application, the computer-readable storage medium is further provided. The computer-readable storage medium stores the computer-executable instructions. When the processor of the device executes the computer-executable instructions, the device performs the method performed by the terminal in the foregoing method embodiments.

In another embodiment of this application, a computer program product is further provided. The computer program product includes the computer-executable instructions, and the computer-executable instructions are stored in the computer-readable storage medium. When the processor of the device executes the computer-executable instructions, the device performs the steps of the method performed by the network device in the foregoing method embodiments.

In another embodiment of this application, the computer program product is further provided. The computer program product includes the computer-executable instructions, and the computer-executable instructions are stored in the computer-readable storage medium. When the processor of the device executes the computer-executable instructions, the device performs the steps of the method performed by the terminal in the foregoing method embodiments.

It may be clearly understood by a person skilled in the art that, for the purpose of convenient and brief description, for a detailed working process of the foregoing system, apparatuses, and units, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division. In actual implementation, there may be another division manner. For example, a plurality of units or components may be combined or integrated into another system, or some features may be ignored or may not be performed. In addition, the displayed or discussed mutual couplings, direct couplings, or communication connections may be implemented by using some interfaces. Indirect couplings or communication connections between the apparatuses or units may be implemented in electronic, mechanical, or another form.

The units described as separate parts may or may not be physically separate, and parts displayed as units may or may not be physical units, may be located in one place, or may be distributed on a plurality of network units. Some or all of the units may be selected according to actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. An apparatus, comprising:

one or more processors configured to execute instructions causing the apparatus to carry out a method comprising:

receiving an uplink reference signal;

obtaining a channel reciprocity parameter between an uplink channel and a downlink channel based on the uplink reference signal;

determining state information of the downlink channel based on:

the channel reciprocity parameter, carrier frequency information of the uplink channel, and carrier frequency information of the downlink channel; and determining a weight of a downlink reference signal based on the state information of the downlink channel.

2. The apparatus according to claim 1, wherein the channel reciprocity parameter comprises: a first channel reciprocity parameter and a second channel reciprocity parameter; and wherein the first channel reciprocity parameter relates to an amplitude and a phase that correspond to a multipath channel, and wherein the second channel reciprocity parameter relates to a distance and an angle that correspond to the multipath channel.

3. The apparatus according to claim 1, wherein the channel reciprocity parameter comprises a third channel reciprocity parameter, a fourth channel reciprocity parameter, a fifth channel reciprocity parameter, and a sixth channel reciprocity parameter; and wherein the third channel reciprocity parameter relates to an amplitude, a phase, and a distance that correspond to a multipath channel, wherein the fourth channel reciprocity parameter relates to the distance corresponding to the multipath channel, and wherein the fifth channel reciprocity parameter and the sixth channel reciprocity parameter relate to the distance and an angle that correspond to the multipath channel.

4. The apparatus according to claim 1, wherein the determining a weight of a downlink reference signal comprises:

determining beam energy of at least one beam based on the state information of the downlink channel, wherein the at least one beam is a beam corresponding to the downlink channel; and determining the weight of the downlink reference signal based on the beam energy.

5. The apparatus according to claim 4, wherein the determining beam energy of at least one beam comprises:

determining the beam energy of the at least one beam based on a channel covariance matrix of the downlink channel.

6. An apparatus, comprising:

one or more processors configured to execute instructions causing the apparatus to carry out a method comprising:

receiving a downlink reference signal;

obtaining a channel reciprocity parameter between an uplink channel and a downlink channel based on the downlink reference signal;

obtaining state information of the uplink channel based on the channel reciprocity parameter, carrier frequency information of the uplink channel, and carrier frequency information of the downlink channel; and determining a weight of an uplink reference signal based on the state information of the uplink channel.

7. The apparatus according to claim 6, wherein the channel reciprocity parameter comprises a first channel reciprocity parameter and a second channel reciprocity parameter; and wherein the first channel reciprocity parameter relates to an amplitude and a phase that correspond to a multipath channel, and wherein the second channel reciprocity parameter relates to a distance and an angle that correspond the multipath channel.

8. The apparatus according to claim 6, wherein the channel reciprocity parameter comprises a third channel reciprocity parameter, a fourth channel reciprocity parameter, a fifth channel reciprocity parameter, and a sixth channel reciprocity parameter; and wherein the third channel reciprocity parameter relates to an amplitude and a distance that correspond to a multipath channel, wherein the fourth channel reciprocity parameter relates to the distance corresponding to the multipath channel, and wherein the fifth channel reciprocity parameter and the sixth channel reciprocity parameter relate to the distance and an angle that correspond to the multipath channel.

9. The apparatus according to claim 6, wherein the-determining a weight of an uplink reference signal comprises:

determining beam energy of at least one beam based on the state information of the uplink channel, wherein the at least one beam is a beam corresponding to the uplink channel; and determining the weight of the uplink reference signal based on the beam energy.

10. The apparatus according to claim 9, wherein the-determining beam energy of at least one beam comprises:

determining the beam energy of the at least one beam based on a channel covariance matrix of the uplink channel.

* * * * *